United States Patent [19]
Lee et al.

[11] Patent Number: 5,905,044
[45] Date of Patent: May 18, 1999

[54] MASS MANUFACTURING METHOD OF SEMICONDUCTOR ACCELERATION AND VIBRATION SENSORS

[75] Inventors: Jong Hyun Lee, Taegu; Woo Jeong Kim, Kyungki-Do, both of Rep. of Korea

[73] Assignees: Kyungpook National University Technology Research Center; Mando Machinery Corporation, both of Rep. of Korea

[21] Appl. No.: 08/319,498

[22] Filed: Oct. 7, 1994

[30] Foreign Application Priority Data

| Oct. 9, 1993 | [KR] | Rep. of Korea | 93-20962 |
| Dec. 24, 1993 | [KR] | Rep. of Korea | 93-29500 |
| Oct. 4, 1994 | [KR] | Rep. of Korea | 94-25355 |
| Oct. 4, 1994 | [KR] | Rep. of Korea | 94-25356 |

[51] Int. Cl.$^6$ .................................................. H01L 21/00
[52] U.S. Cl. ........................ 437/228; 437/245; 437/246; 437/921; 437/927; 73/654; 73/514.01; 73/514.34
[58] Field of Search ................................ 437/225, 245, 437/228, 246, 228 H, 228 SEN, 921, 927, 230; 156/657.1, 662.1; 73/654, 514.01, 514.34

[56] References Cited

U.S. PATENT DOCUMENTS

| 4,893,509 | 1/1990 | Maliver et al. ................. 73/517 AV |
| 5,006,487 | 4/1991 | Stokes .............................. 437/228 |

FOREIGN PATENT DOCUMENTS

| 1163671 | 6/1989 | Japan ........................... 73/654 |

*Primary Examiner*—Charles L. Bowers, Jr.
*Assistant Examiner*—Matthew Whipple
*Attorney, Agent, or Firm*—Irving Keschner

[57] ABSTRACT

A mass manufacturing method of semiconductor acceleration and vibration sensors uses a dispensing method, a electrical plating method, a screen-printing method or a preforming method in manufacturing a mass made of metal pastes in a desired size and amount on a mass pad of a thin metal film which is formed on a beam in a given pattern, so that it can be adapted to the mass-production of the sensors having the mass of the desired amount and size.

9 Claims, 7 Drawing Sheets

MASS MANUFACTURING METHOD OF SEMICONDUCTOR ACCELERATION AND VIBRATION SENSORS

BACKGROUND OF THE INVENTION

The invention is related to providing a mass manufacturing method of semiconductor acceleration and vibration sensors and, in particular, to providing a mass manufacturing method having an exactly amount and size and for simplifying its own process and being adaptable to a mass production.

PRIOR ART

A conventional typical example is semiconductor acceleration and vibration sensors as shown in FIG. 1. The semiconductor acceleration and vibration sensor of a piezo-resistance body type includes a piezo-resistance body 2 provided on a silicon substrate 1 for converting an acceleration and vibration into a resistive value, a beam 3 flexed (stressed) by the effect of the acceleration and a mass 4 for transferring the force of the acceleration to the beam 3. In other words, this sensor is configured to transfer the load caused by the acceleration to the beam 3. Thus, the stress is dispersed through the beam 3 to the piezo-resistance body 2 to vary its own resistance. This sensor requires a mass for transferring the acceleration to the beam 3, which must be a seismic proof-mass to enhance the sensitivity and response characteristics of the sensor. In order to manufacture the seismic proof mass the mass is manufactured by three methods as follows: the silicon substrate itself being etched in a three dimensional manner to have its own mass, a heavy metal such as gold (Au), Platinum (Pt) etc. being vacuum-vaporized on the beam and a metal plate being soldered to the beam.

However, among these methods, the manufacturing method of the integrated mass requires many etching processes, these processes are complex as well as the difficulties in the etching of the uniform side surface cause the serious inhomogeneity of the mass. It is difficult in a mass production to make sure the uniformity of a product. The method of a metal vacuum-vaporization for manufacturing a mass has a difficulty in manufacturing a heavy mass due to the etching of the thick metal. The method for processing the metal plate also has problems in the accuracy and the mass production.

The object of the invention is to provide an improved mass manufacturing method of semiconductor acceleration and vibration sensors to resolve the disadvantages and problems in manufacturing a mass according to a conventional method.

The other object of the invention is to provide a mass manufacturing method of semiconductor acceleration and vibration sensors to which a metal paste dispensing is adapted.

Another object of the invention is to provide a mass manufacturing method of semiconductor acceleration and vibration sensors to which a metal plating is adapted.

Still another object of the invention is to provide a mass manufacturing method of semiconductor acceleration and vibration sensors to which a screen printing is adapted.

Still another object of the invention is to provide a mass manufacturing method of semiconductor acceleration and vibration sensors to which a metal paste preforming is adapted.

According to the invention, a mass manufacturing method of semiconductor acceleration and vibration sensors comprises steps of: forming at least one piezo-resistance body on a silicon substrate after cleaning a silicon wafer; vacuum-vaporizing a thin metal film on the silicon substrate; patterning the thin metal film in the lithograph and wet etching and then annealing (heating) it; forming a metal paste on the patterned thin metal film in a manner that the metal paste is dispensed by means of a dispenser, screen-printed by means of a metal mask or previously manufactured as a metal preform in a tablet shape; and annealing the metal paste or preform and then hardening it.

According to the other embodiment of the invention, a mass manufacturing method of semiconductor acceleration and vibration sensors comprises steps of: forming at least one piezo-resistance body on a silicon substrate after cleaning the silicon substrate; vacuum-vaporizing a thin metal film on the silicon substrate; patterning the thin metal film in the lithograph and wet etching manner and then annealing it; forming a spin-on type photo-resist and at least two dry-film photoresists in a multi-layer structure on the thin metal film and then defining a mass pad; and plating a metal on the mass pad, electrically.

Thus, the invention provides a mass manufacturing method of semiconductor acceleration and vibration sensors can form a mass having a predetermined amount and size on a metal pad called "a mass pad", so that different masses are respectively positioned on one silicon chip.

BRIEF DESCRIPTION OF THE DRAWINGS

The invention will now be described in detail with reference to the accompanying drawings; in which.

DETAILED DESCRIPTION OF THE INVENTION

Figure 1:
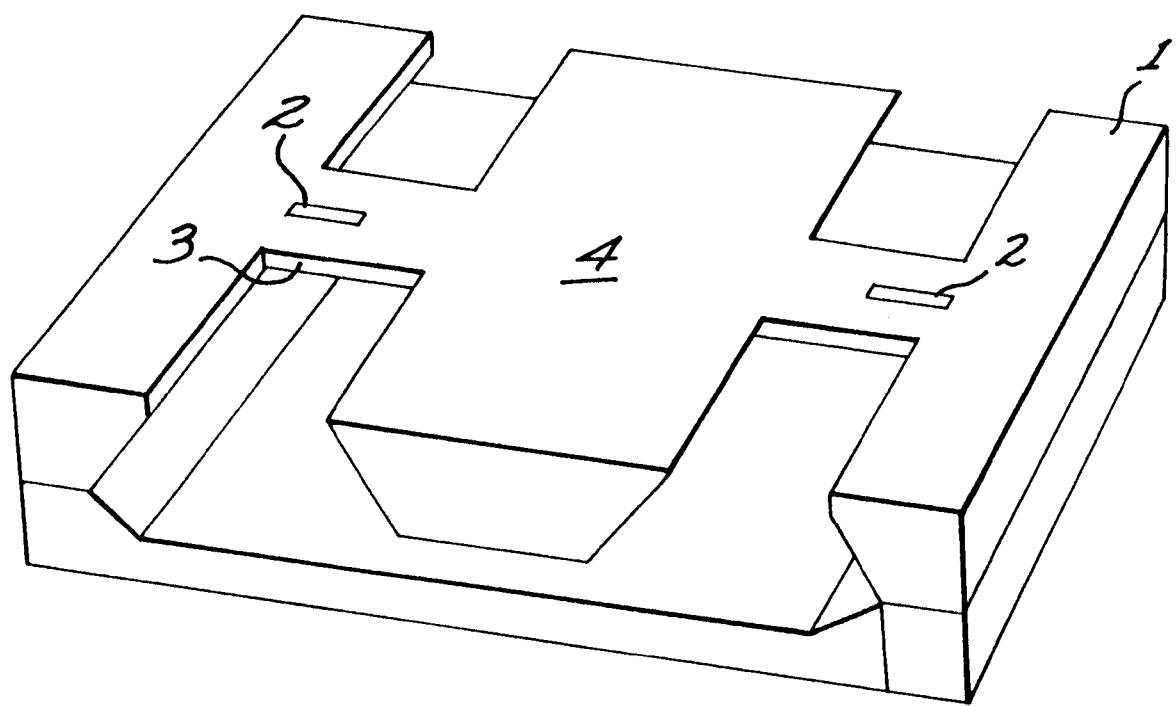
FIG. 1 is a schematic perspective view illustrating a conventional semiconductor acceleration and vibration sensor.
Figure 2A:
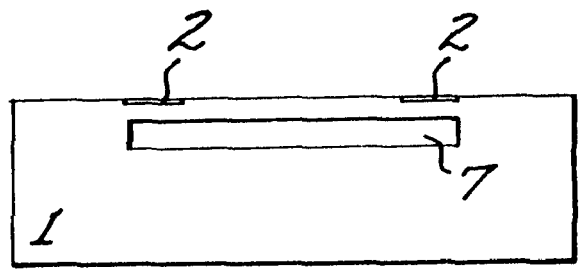
FIG. 2, a to e are views illustrating steps of manufacturing a mass of semiconductor acceleration and vibration sensors according to one embodiment of the invention.
Figure 2B:
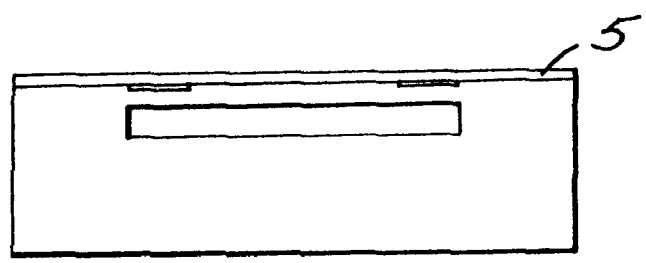
Figure 2C:
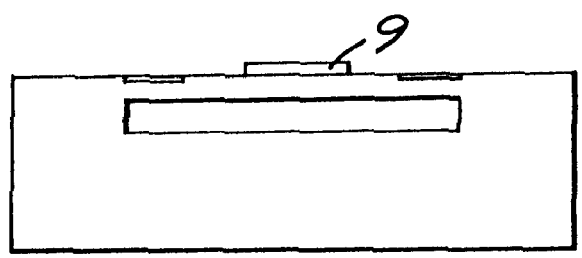
Figure 2D:
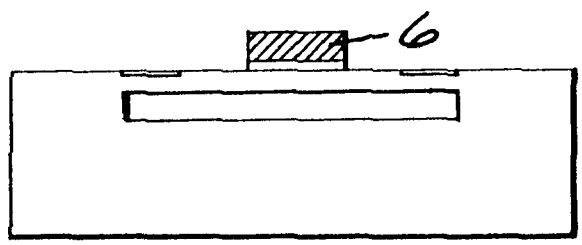
Figure 2E:
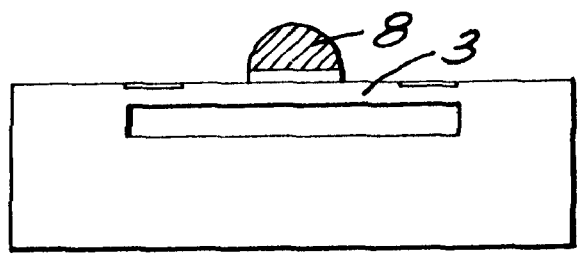
Figure 3:
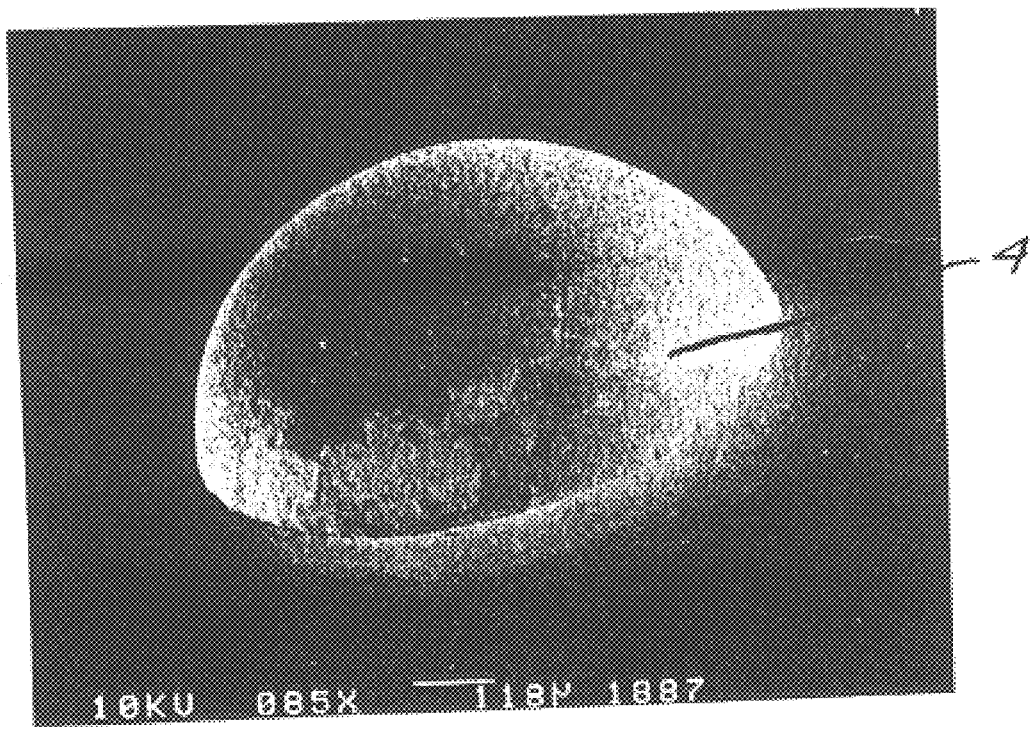
FIG. 3 is a SEM photograph illustrating a mass manufactured according to an aspect of the invention.
Figure 4A:
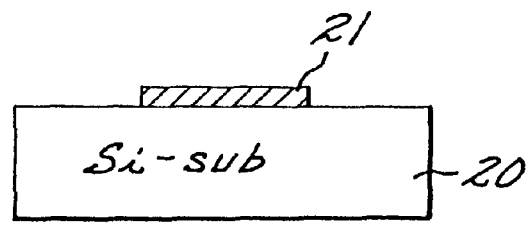
FIG. 4, a to d are views illustrating steps of manufacturing a mass of semiconductor acceleration and vibration sensors according to the other embodiment of the invention.
Figure 4B:
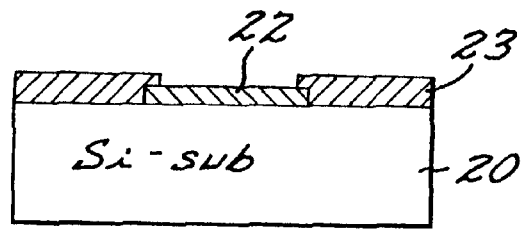
Figure 4C:
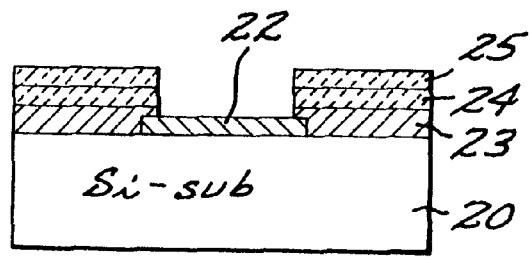
Figure 4D:
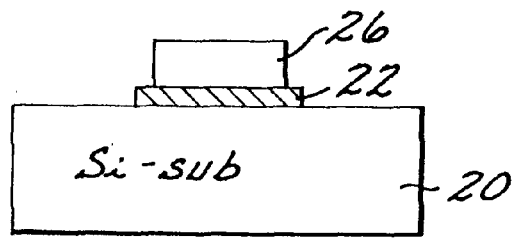

Referring to FIG. 2, semiconductor acceleration and vibration sensors are provided with a silicon substrate 1. The silicon substrate 1 includes a piezo-resistance body 2 provided thereon for converting an acceleration and a vibration into a resistive value, a beam 3 flexed by the effects of the acceleration and a vibration, an air gap 7 formed as a hollow space to give the elastical force to the beam 3 and a mass 4 for transferring the force of the acceleration or the vibration to the beam 3.

Explaining the manufacturing method of semiconductor acceleration and vibration sensors in detail, as shown in FIG.

2, *a,* the silicon substrate 1 having a crystal plane of (001) and a resistivity of 5 Ω cm is first cleaned, and then the piezo-resistance body 2 and the air gap 7 are formed through a micro-machining and a diffusing on or in the silicon substrate 1.

As shown in FIG. 2, *b,* a thin nickel film 5 is vacuum-vaporized on the front surface of the silicon substrate 1 by a thickness of 1800 to 2000 A°, which is constituted as a mass pad.

As shown in FIG. 2, *c,* the thin nickel film 5 is patterned in lithograph and wet etching manners and then annealed to constitute a mass pad 9. Thus, the mass pad 9 is oxidized at the surface of the nickel (Ni) during the annealing thereby to form a nickel silicide, and the nickel oxidized layer is removed by using the ammonia solution ($NH_4OH$). On the other hand, the thin nickel film forms the oxide layer of NiSi at the temperature of 350° C. and the oxide layer of $NiSi_2$ at the temperature of 750° C. The nickel silicide improves the mechanical and electrical contacts between a mass and the silicon substrate 1.

Next, a metal paste 6 is positioned on the mass pad 9. To it, one aspect of the invention uses a dispenser to position a metal paste on the mass pad 9. Thus, the solder pastes are positioned on the mass pad 9 to form a mass 8. The mass 8 may have a fine deviation during the mass-production, but it can be completely corrected when the resistance magnitude of the output terminal of a hybrid integrated circuit is trimmed.

Figure 6:
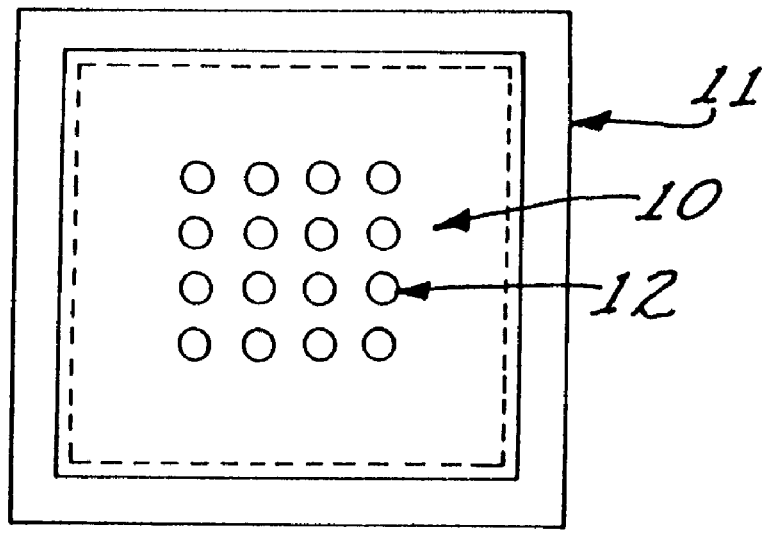
FIG. 6 is a plane view of a metal mask used in manufacturing a mass according to the other aspect of the invention.
Figure 8:
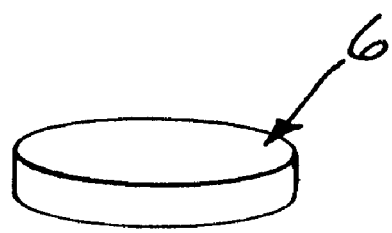
Figure 7A:
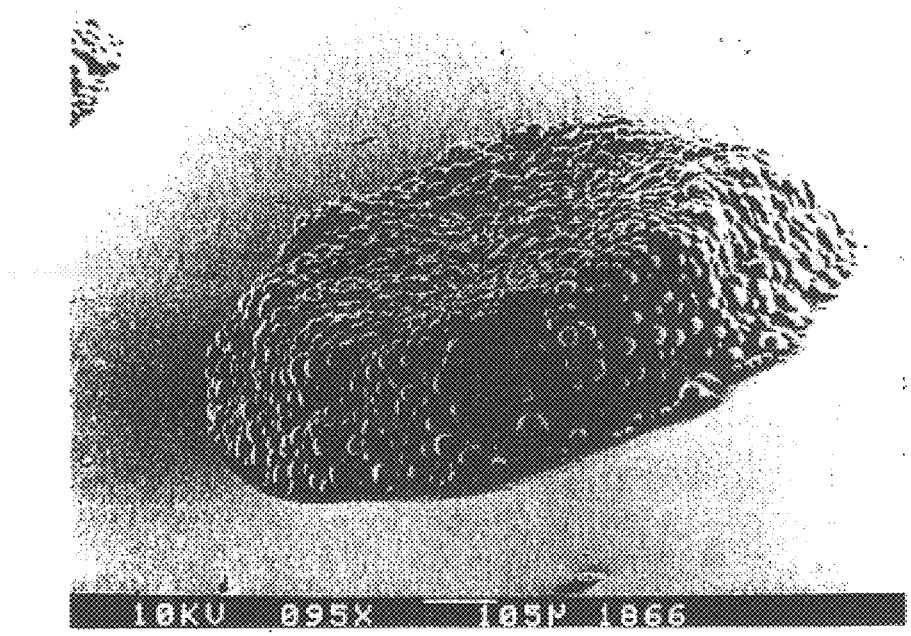
FIG. 7, a and b are photographs illustrating a mass manufactured according to the aspect of FIG. 6 about the time of the annealing; and, FIG. 8 is a view illustrating a metal preform manufactured according to another aspect of the invention.
Figure 7B:
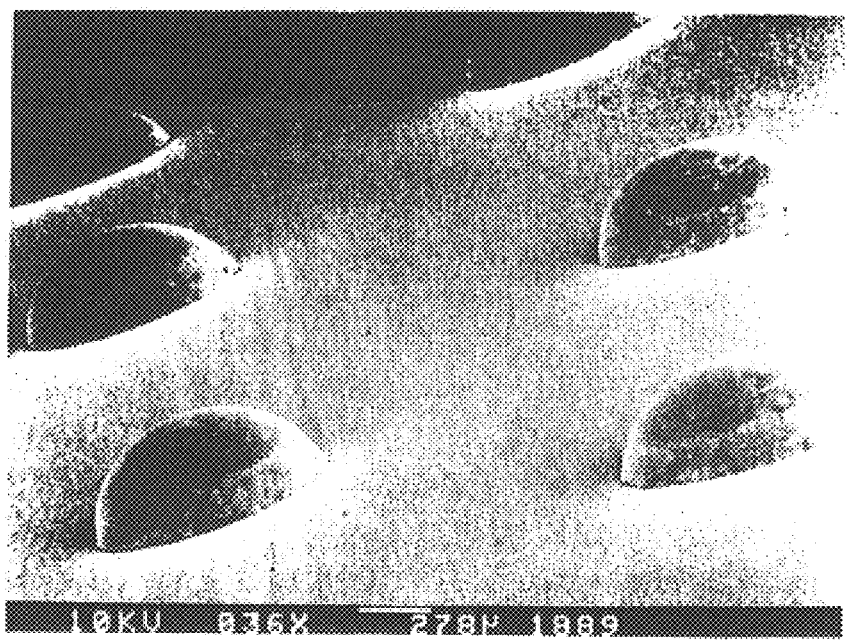

The other aspect of the invention is to manufacture a mass by screen-printing a metal paste on the silicon substrate 1 using a metal mask 10 as shown in FIG. 6. The metal mask 10 includes a aluminum frame 11 supporting the circumference thereof and a pattern 12 having a shape equal to that of a mass to be formed on the position corresponding to each of the nickel silicide which are formed on the beam 3. The patterns 12 are a dot pattern in the drawing. Thus, as shown in FIG. 2, *e,* the metal mask 10 is placed to face its pattern 12 to the mass pads 9 on the silicon substrate 1. Then, the metal paste is applied to the metal mask 10 to screen-print a metal paste 6 having a predetermined shape and weight on the mass pads 9. Then, the metal mask 10 is removed from the silicon substrate 1. The metal paste 6 is represented as photographs about the time of the annealing as shown FIG. 7, *a* and *b.*

Another aspect of the invention is to provide a metal preform 6 constituted as a mass, which is previously made of metal pastes in a tablet shape. The metal preform 6 is manufactured in various sizes according to its use. Thus, this process is to position all previous manufactured metal preform or metal pastes 6 on the mass pads 9 of the silicon substrate 1.

As described above, after the metal paste 6 is formed, the metal paste 6 is annealed at the temperature of 180 to 200° C. and then hardened to form a mass 8. At that time, the size of a mass can be adjusted according to the diameter, thickness and kind of a metal.

On the other hand, the metal paste may include alloys of Pb/Sn, Ag/Pd, Pt/Au and Pb/Sn/Ag, and the mass pad may include chromium (Cr), Gold (Au) or alloys of Au/Ni/Cr and Au/Cr/Ti substituted for the nickel within the range of not escaping from the subject matter of the invention. These metals also may be constructed as a multi thin film.

Figure 5A:
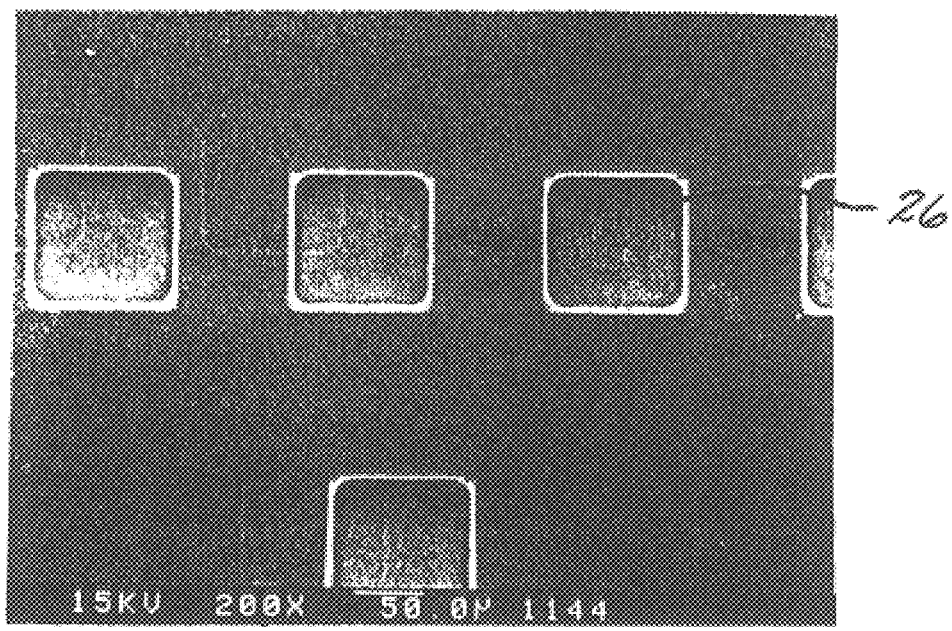
FIG. 5, a and b are photographs illustrating a semiconductor acceleration and vibration sensor having a mass manufactured according to the method of FIG. 4.
Figure 5B:
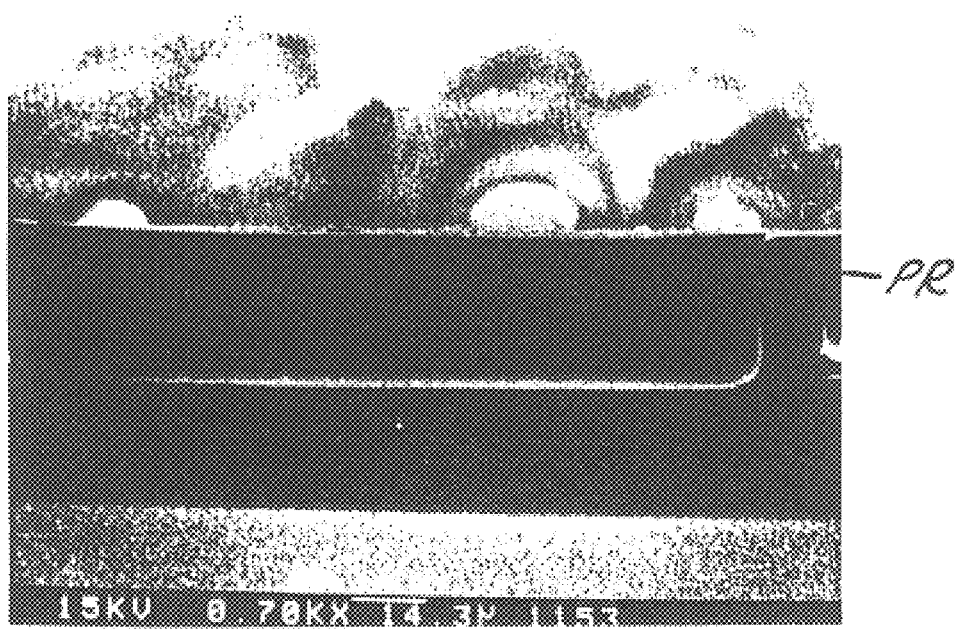

The other embodiment of the invention adapts the electrical plating as shown in FIGS. 4 and 5.

Referring to FIGS. 4 and 5, a silicon substrate 1 is cleaned, and a piezo-resistance body is formed in the same manner as the embodiment of FIG. 2. Then, a thin metal film made of nickel is vacuum-vaporized on the silicon substrate 1, while a photo-resist is coated on the thin metal film to define the pattern. Thereafter, the thin nickel film is etched at the temperature of 30 to 50° C. for the time period of 15 to 25 seconds using the solution of $FeCl_3$ as shown in FIG. 4, *a.*

In order to increase the adhesive property and electrical conduction between a mass and the silicon substrate 20, the thin nickel film 21 is annealed at the temperature of 350 to 700° C. through RTP (Rapid Thermal processing) to form the oxidized nickel silicide such as NiSi or $NiSi_2$ on the surface thereof. Subsequently, a photo-resist layer 23 is coated, hard-baked and hardened to define a mass pad area as shown in FIG. 4, *b,* in which the photo-resist of a spin-on type is used to remove the effect of photo-resist scum during the growing of a dry film photo resist as well as to prevent the over-development of the dry film photo-resist due to the poor adhesion, which may happen at next procedures.

Therefore, first dry film photo-resist 24 is formed on the photo-resist 23 to define the mass pad. Second dry film photo-resist 25 is coated on the first dry film photo-resist 24 to define the mass pad, again. Then, the nickel oxidation film of NiSi or $NiSi_2$ formed by the RTP process is removed using the ammonium solution of $NH_4OH$ as shown in FIG. 4, *c,* in which the dry film photo-resist layer may be formed in a multi-layer over two floors, if necessary.

Thus, a nickel electrical plating as such an electrolytic or non-electrolytic electrical plating etc. is performed to form a mass 26 under the exact control of the density and thickness, using a metal plating system. That is, the second and first dry film photo-resists 25 and 24 and the photo-resist 23 are removed in order by means of a stripper to form the mass 6 as shown in FIG. 4, *d.*

FIGS. 5, *a* and *b* are respectively showing a plane photograph and a cross-sectional photograph of a mass manufactured according to the principal of the invention. Herein, the reference 26 is a mass, and PR is dry film photo-resists 24 and 25. It is noted from these pictures that the mass is manufactured in a higher accuracy.

The mass manufacturing method enables a mass of a given amount to be easily and electrically plated on a desired position and has advantages in that the fine deviation of the mass caused during the manufacturing can be corrected by trimming the resistor magnitude of the output terminal of a hybrid integrated circuit, and various sensors having different masses on one chip are easily manufactured because the size of a mass forming portion is defined by a lithography process.

Therefore, the sensors manufactured according to the invention can be used as an acceleration sensor and a vibration sensor which the force of the acceleration or vibration is applied to a beam, and the stress of the beam is transferred to a piezo-resistance body to cause the resistive changes, thereby detecting the acceleration or the vibration.

As described above, a mass manufacturing method of semiconductor acceleration and vibration sensors and, in particular according to the invention enables a metal paste to be manufactured in a desired size and amount based on the exact positioning of a metal paste in the same shape as a mass pad on a silicon substrate. It can provide ideal acceleration and vibration sensors that the manufacturing and the mass-production are very easy.

What is claimed is:

1. A mass manufacturing method of semiconductor acceleration and vibration sensors comprising the steps of:

forming at least one piezo-resistance body on a silicon substrate after cleaning said silicon substrate;

vacuum-vaporizing a thin metal film on the silicon substrate;

patterning the thin metal film using lithography and wet etching and then annealing said thin film;

forming an amount of material comprising a metal on the patterned thin metal film; and annealing the metal material and then hardening the metal material.

2. The mass manufacturing method of semiconductor acceleration and vibration sensors as claimed in claim 1, in which:

the metal material is positioned on the thin metal film in a dispensing manner.

3. The mass manufacturing method of semiconductor acceleration and vibration sensors as claimed in claim 1, in which:

the metal material is positioned on the thin metal film in a screen-print manner using a metal mask.

4. The mass manufacturing method of semiconductor acceleration and vibration sensors as claimed in claim 1, in which:

the metal material is preformed in a tablet shape and then is positioned on the thin metal film.

5. The mass manufacturing method of semiconductor acceleration and vibration sensors as claimed in claim 1, in which:

the thin metal film is made of nickel by the thickness of 1800 to 2000 A°.

6. The mass manufacturing method of semiconductor acceleration and vibration sensors as claimed in claim 1, in which:

the thin metal film is formed in a multi-layered thin film, using any one of Chromium Cr, Gold Au and alloy of Au/Cr/Ti instead of the nickel.

7. The mass manufacturing method of semiconductor acceleration and vibration sensors as claimed in claim 1, in which:

the temperature is 350 to 750 C. during annealing of said thin metal film based on a RTP method.

8. The mass manufacturing method of semiconductor acceleration and vibration sensors as claimed in claim 1, in which:

the metal material is any one of alloys of Pb/Sn, Ag/Au, Pt/Au and Pb/Sn/Ag.

9. The mass manufacturing method of semiconductor acceleration and vibration sensors as claimed in claim 1, in which:

the temperature is 180 to 200° C. during the annealing of the metal material.

* * * * *